Nov. 19, 1957   L. B. HUFFMAN   2,813,280
MACHINE TOOL FOR DRILLING AND TAPPING HOLES
Filed Oct. 12, 1955   3 Sheets-Sheet 1

INVENTOR.
Leland B. Huffman
BY
Attorney.

Nov. 19, 1957  L. B. HUFFMAN  2,813,280
MACHINE TOOL FOR DRILLING AND TAPPING HOLES
Filed Oct. 12, 1955  3 Sheets-Sheet 2

INVENTOR.
Leland B. Huffman
BY
Otto Q. Earl
Attorney.

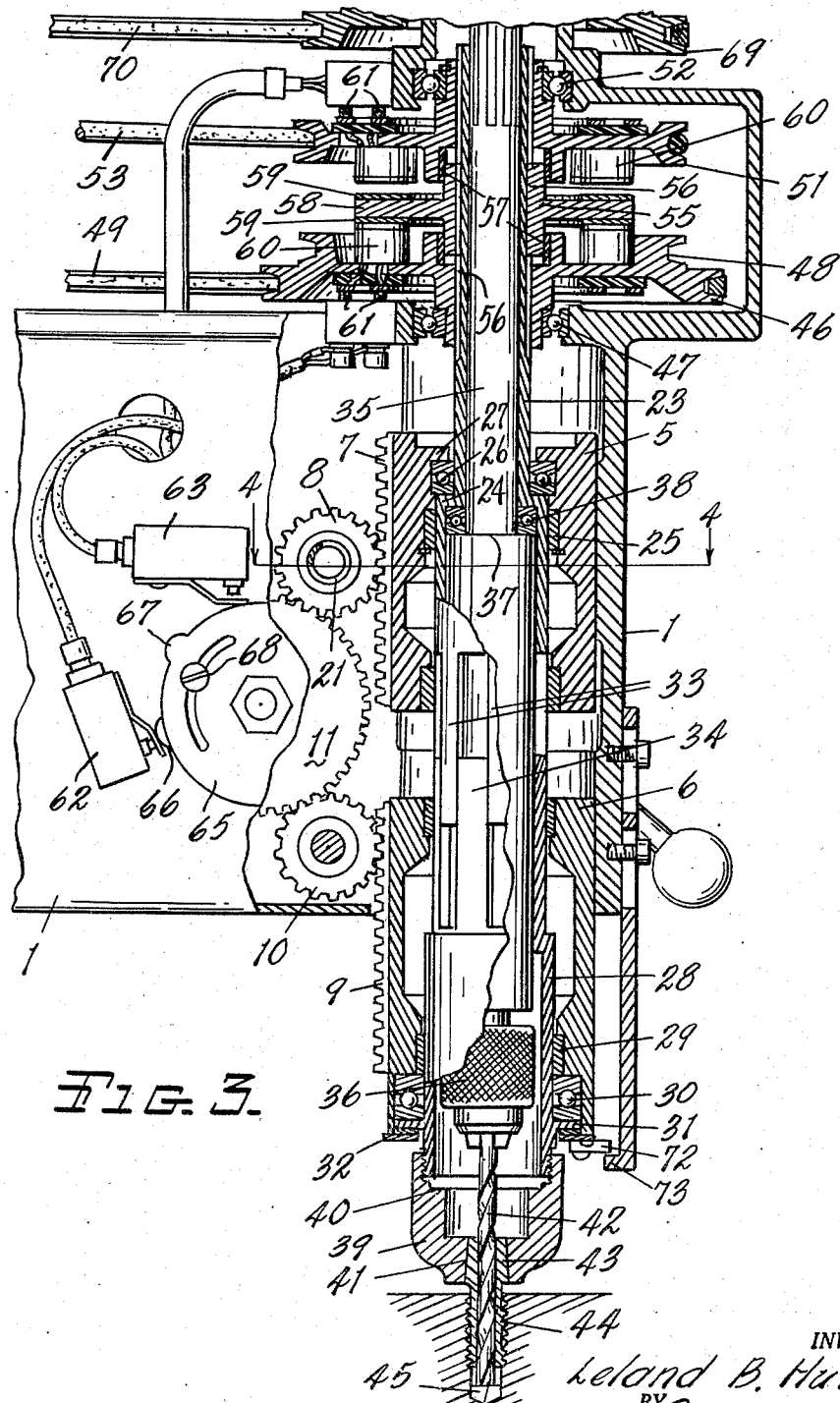

United States Patent Office 2,813,280
Patented Nov. 19, 1957

2,813,280

MACHINE TOOL FOR DRILLING AND TAPPING HOLES

Leland B. Huffman, Kalamazoo, Mich., assignor to Herman M. Huffman, Kalamazoo, Mich.

Application October 12, 1955, Serial No. 540,011

12 Claims. (Cl. 10—128)

This invention relates to improvements in machine tool for drilling and tapping holes.

The principal objects of this invention are:

First, to provide a machine tool similar to a drill press which will both drill and tap holes in a work piece without resetting or adjusting the work between the drilling and tapping operations.

Second, to provide a tool that will first advance a rotating drill to drill a hole and then advance a rotating tapping tool around the drill to tap the hole just bored by the drill.

Third, to provide means for simultaneously advancing a rotating drill and tap with the drill in advance of the tap and for latter individually advancing the tap to overtake the drill.

Fourth, to provide a tap advancing and rotating structure that will automatically reverse the direction of rotation of the tap at the end of the advancing motion of the tap.

Other objects and advantages of the invention will be apparent from a consideration of the following description and claims. The drawings, of which there are three sheets, illustrate a highly practical form of the drilling and tapping machine.

Fig. 3 is a fragmentary vertical longitudinal cross sectional view taken along the plane of the line 3—3 in Fig. 2 and illustrating the mechanism for supporting, driving and advancing the drill and tap of the machine.

The drilling and tapping machine is built along the lines of a drill press and utilizes many of the structures commonly found in a standard drill press. The machine includes a supporting head 1 mounted on a vertical column 2 and having a driving motor 3 mounted on the backside of the head. The column 2 adjustably supports a work table 4 and the column may be supported by any suitable base not illustrated.

Figure 1:
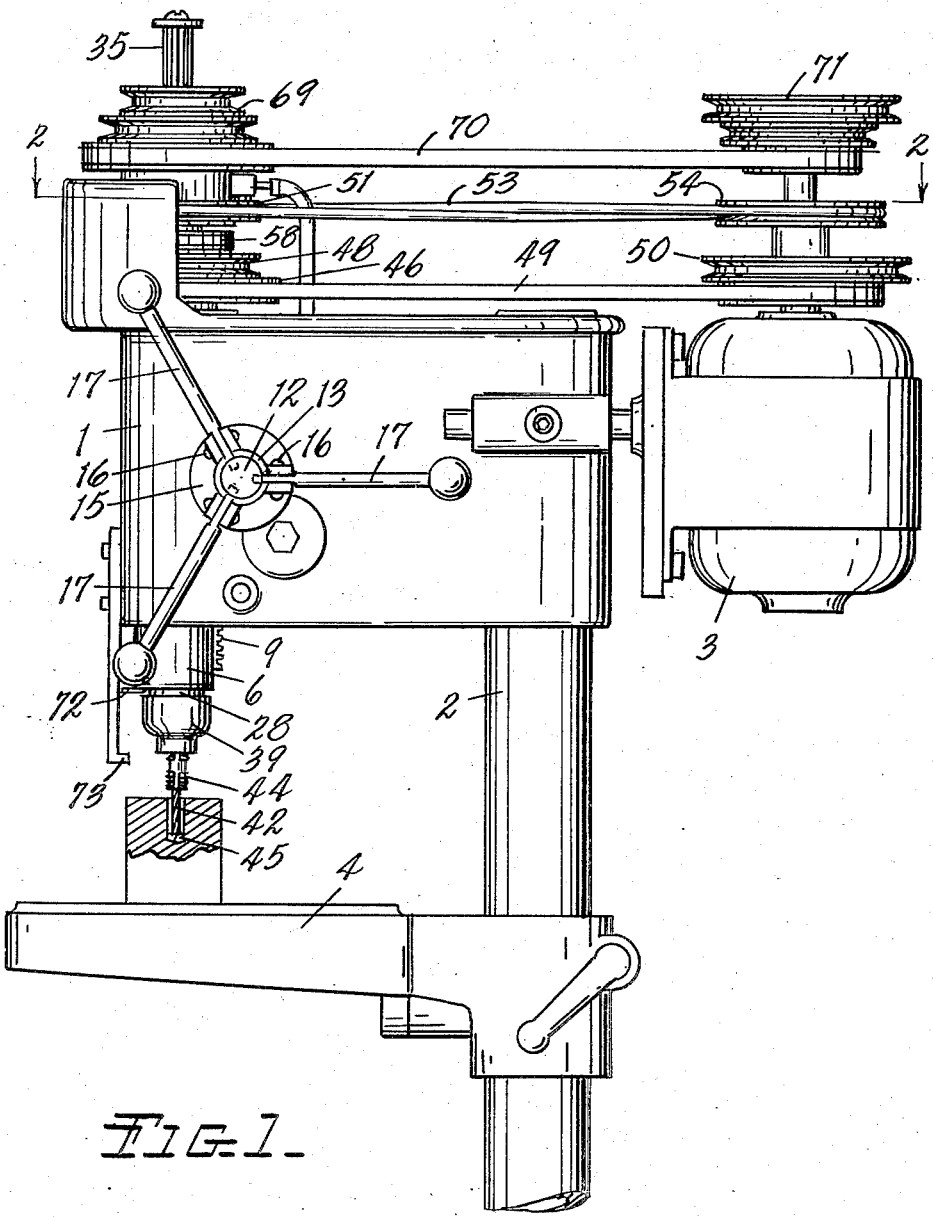
Fig. 1 is a side elevational view of a machine tool incorporating the drilling and tapping features of the invention.
Figure 4:
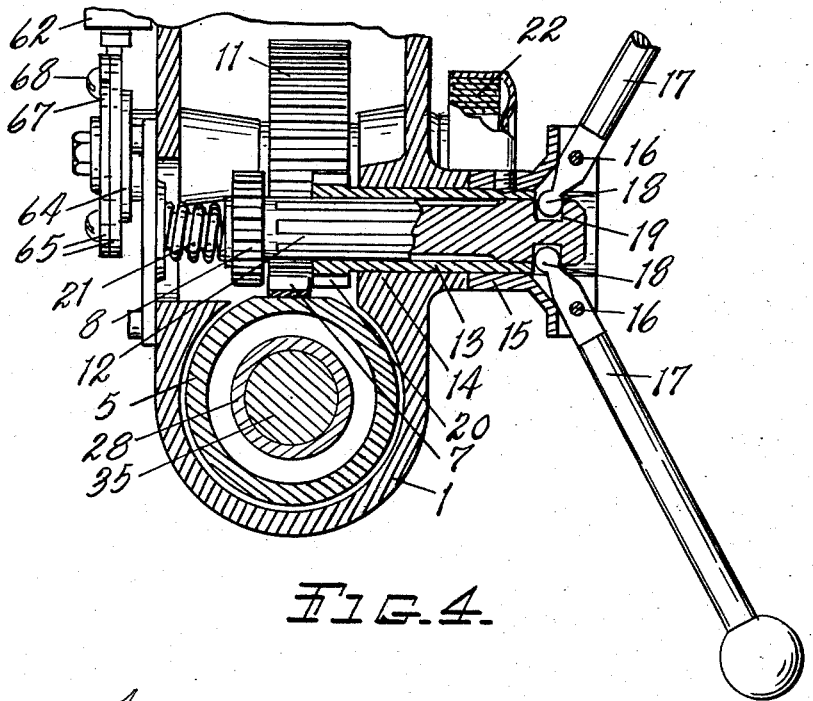
Fig. 4 is a fragmentary transverse cross sectional view through the tool advancing mechanism taken along the plane of the line 4—4 in Fig. 3.
Figure 2:
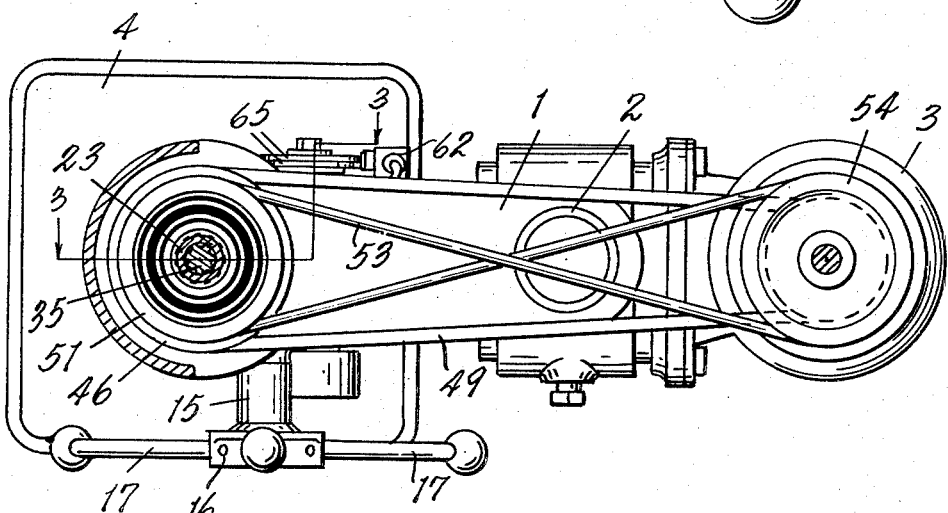
Fig. 2 is a fragmentary transverse cross sectional view taken along the plane of the line 2—2 in Fig. 1 and illustrating the reverse drive to the tapping tool.

As appears in greater detail in Fig. 3 the supporting head 1 slidably supports an upper sleeve 5 and a coaxial lower sleeve 6. The upper sleeve 5 has external rack teeth 7 in mesh with an upper pinion 8 and the lower sleeve 6 has external rack teeth 9 in mesh with a lower pinion 10. The pinions 8 and 10 support and control the vertical movement of the sleeves in the head and an intermediate gear 11 meshing with both the pinions controls the pinions for simultaneous operation of the sleeves. The upper pinion 8 is mounted on a splined shaft 12 (see Fig. 4) which is in turn slidably and drivingly engaged within an internal splined hollow shaft 13. The hollow shaft 13 is journaled in a bearing portion 14 in the side of the head and has a hub 15 secured to its outer end. The hub 15 carries a plurality of angularly spaced pivots 16 located in radially spaced relation to the center of the shaft. The pivots 16 support a plurality of manually operable handles 17 and the inner ends of the handles have knobs 18 received in an annular groove 19 in the end of the inner splined shaft 12. The external shaft 14 carries a pinion 20 that is constantly in mesh with the intermediate gear 11.

From the foregoing it will be seen that rotation of the handles 17 above the axis of the shaft 12 will rotate the pinions 8 and 20 to simultaneously rotate the intermediate gear 11 and lower pinion 10. If the handles 17 are swung inwardly into a plane perpendicular to the shaft 12 the upper pinion 8 will mesh with the rack teeth 7 and advance or retract the upper sleeve 5. Similarly the lower pinion will simultaneously advance or retract the lower sleeve 6. When the handles 17 are swung laterally outwardly about the pivots 16 the pinion 8 will be disengaged from the upper sleeve so that continued rotation of the shaft 12 will result in individual advancing or retracting motion of the sleeve 6. A spring 21 biases the upper pinion 8 and shaft 12 toward engagement with the upper rack teeth 7. A coil spring 22 on the outer end of the shaft of the intermediate gear biases the gear and pinions toward raised or retracted position of the sleeves 5 and 6.

Rotatably mounted within the upper sleeve 5 is a hollow drive shaft 23 having an outwardly and upwardly facing shoulder 24. A journal bearing 25 radially supports the hollow shaft within the sleeve while a ball bearing 26 is arranged in thrust transmitting relation between the shoulder 24 and an inwardly projecting annular flange 27 on the upper end of the upper sleeve 5.

Rotatably positioned within the lower sleeve 6 is a tubular shaft 28 that projects downwardly below the lower end of the lower sleeve 6. Journal bearings 29 radially support the tubular shaft in the lower sleeve and a ball bearing 30 is positioned in thrust transmitting relation between the lower end of the lower sleve 6 and a radial flange 31 on the tubular shaft. A retaining ring 32 secured to the lower end of the lower sleeve overlaps the flange 31 to retain the tubular shaft in axially fixed relation with respect to the lower sleeve 6.

The opposed ends of the hollow shaft 23 and the tubular shaft 28 have mating angularly interlocked axially slidable fingers 33 and 34 thereon so that rotation of the hollow shaft 23 is transmitted to the tubular shaft 28 in axially adjusted positions of the tubular shaft. Rotatably mounted within the hollow shaft 23 and the tubular shaft 28 is an inner drive shaft 35 having a standard drill chuck 36 on its lower end. The inner shaft is provided with a radially extending upwardly facing shoulder 37 which shoulder supports a ball bearing 38 in thrust relation between the inner shaft and the inside of the shoulder 24 on the hollow shaft 23. The inner shaft 35 is initially retained axially against the thrust bearing 38 by a chambered housing 39 threaded on the lower end of the tubular shaft 28. The housing 39 has a thrust shoulder 40 adapted to bear against the lower end of the chuck 36 when the lower sleeve 6 and tubular shaft are retracted upwardly with respect to the inner shaft and chuck. This retracts the inner shaft and the chuck. The housing 39 defines a central upwardly tapered bore 41 adapted to pass the stem of a drill tool 42 clamped in the chuck 36. The tapered hole 41 further receives the tapered shank 43 of a tubular tap tool 44 that surrounds the drill 42. The lower end of the drill 42 has an enlarged cutting tip 45 of the correct diameter for drilling a hole to be tapped by the tapping tool 44.

The driving connection to the tools are positioned in the upper portion of the head 1 where a direct drive pulley 46 has its hub supported in the bearing 47 and around the hollow shaft 23. The pulley 46 has one or more pulley grooves 48 for engagement with a belt 49. The belt extends to a suitable drive pulley 50 on the shaft of the motor 3 for direct or forward drive of the hollow shaft. A second pulley 51 has its hub rotatably supported in the bearing 52 in spaced relationship above the pulley 46 and around the hollow shaft 23. The pulley 51 is driven by a belt 53 that is crossed and trained around a pulley 54 on the motor shaft for reverse drive of the hollow shaft 23. The pulleys 46 and 52 are constantly driven so means are provided for selectively engaging one or the other of the pulleys with the hollow shaft.

The reversible clutch connection between the hollow shaft 23 and the pulleys 46 and 51 includes an internally splined hub 55 slidably engaged with an externally splined portion 56 on the upper end of the hollow shaft 23. The hub is further rotatably supported in bushings 57 within the hubs of the pulleys. Extending outwardly from the hub 56 is a clutch wheel 58 having oppositely facing friction faces 59 opposed to the sides of the pulleys 46 and 51. Each of the pulleys 46 and 51 carries an electro-magnetic coil 60 which when energized will attract the clutch wheel 58 into frictional driving engagement with its pulley. Brushes for energizing the electro-magnetic coils are indicated at 61.

The energization of the electro-magnets 60 and the direction of rotation of the hollow shaft 23 and the tapping tool 44 are automatically controlled by a pair of switches 62 and 63 positioned on the side of the head in proximity to the shaft of the intermediate gear 11. Clamped to the end of the shaft for rotation with the gear 11 is a wheel 64 having a pair of cam plates 65 angularly adjustably mounted thereon. The cam plates 65 have cam lobes 66 and 67 that may be clamped in angularly adjusted positions by the clamp screw 68 and which are adapted to engage and actuate the switches 62 and 63 respectively. By proper adjustment of the cam plates 65 the cam lobe 66 can be made to actuate the switch 62 and reverse the energization of the electro-magnets 60 and the drive of the tapping tool 44 when the tapping tool has been advanced or lowered to any point in its range of travel. The tapping tool will therefore immediately reverse its rotation and thread its way up out of the hole regardless of the attention or inattention of the operator. When the operator returns the sleeves 5 and 6 to their retracted elevated position corresponding rotation of the intermediate gear 11 and the cam lobe 67 will engage the switch 63 to again change the energization of the electro-magnets and automatically change the drive of the tapping tool to forward rotation.

The inner shaft 35 and the drill tool 42 carried thereby are constantly driven in a forward drilling direction by means of a stepped pulley 69 on the upper splined end of the inner shaft. The pulley 69 is connected by a belt 70 to a stepped pulley 71 on the shaft of the motor 3. The drill tool 42 does not have to be reversed because it can be withdrawn from the hole while continuing to rotate forwardly as will be understood.

With the upper sleeve 5 and lower sleeve 6 in fully raised retracted position and with the proper size drill tool 42 and tapping tool 44 mounted in position the operation of the machine is as follows. The handles 17 are swung laterally inwardly toward the head of the machine to engage the pinion 8 with the upper rack teeth 7. The handles 17 are then rotated to simultaneously advance both the upper and lower sleeves with the upper sleeve 5 acting through the thrust bearing 26 and 38 against the shoulder 37 on the inner shaft to advance the drill tool into the work. When the drill has been advanced as far as desired the handles 17 are swung laterally outwardly disconnecting the drive to the upper sleeve at the pinion 8 and continued rotation of the handles advances the lower sleeve 6. The lower sleeve acts through the thrust bearing 30 advances the tubular shaft 28 and the tapping tool carried thereby thus feeding the tapping tool into the hole just bored by the drill. Rotary drive to the tubular shaft 28 is maintained through the sliding fingers 33 and 34. Lowering or advancing motion of the lower sleeve and the tapping tool may be mechanically limited by a lug 72 on the lower end of the lower sleeve engaging a vertically adjustable stop 73 mounted on the front of the head. The cam lobe 66 should be adjusted correspondingly to the stop 73 to immediately reverse the magnetic clutch for reversing the rotation of the tapping tool when the lug 72 strikes the stop 73. To return the tools to elevated retracted position the operator merely reverses rotation of the handles 17 so that the gear 11 and pinion 10 elevate the lower sleeve 6. In its upward motion the lower sleeve 6 overtakes and picks up the upper sleeve 5 to return both sleeves to fully elevated position in which the teeth of the upper pinion 8 will be aligned with the upper teeth of the upper rack 7 so that inward swinging motion of the handles will reengage the upper pinion 8 with the upper rack teeth 7 in the original starting position of the several parts.

Having thus described the invention, what is claimed as new and is desired to be secured by Letters Patent is:

1. A drilling and tapping tool comprising a support head with a work table positioned therebelow, upper and lower drive sleeves coaxially arranged and vertically slidably mounted in said head, a hollow drive shaft rotatably and axially slidably mounted on said support and extending axially into said sleeves, a radially outwardly extending shoulder on said hollow shaft, a first thrust bearing between the upwardly facing surface of said shoulder and a downwardly facing portion of said upper sleeve, an inner drive shaft positioned within said hollow shaft and projecting from the upper end thereof, a shoulder on said inner shaft opposed to the shoulder on said hollow shaft, a second thrust bearing between said opposed shoulders, a lower tubular shaft rotatably mounted within said lower sleeve and around said inner shaft, a third thrust bearing axially engaged and retained between said lower sleeve and said tubular shaft, angularly spaced axially extending fingers on the upper end of said tubular shaft axially slidably and angularly drivingly engaged with mating fingers on the lower end of said hollow shaft, a chuck on the lower end of said inner shaft, a chambered housing removably secured to the lower end of said tubular shaft and having a shoulder engageable with the lower end of said chuck, said housing defining an upwardly tapered hole coaxial with said chuck, a drill received in said chuck and extending through said hole in said housing, a hollow tapping tool sleeved around said drill and having its upper end engaged in said hole in said housing, said drill having a tip of the same size as said tapping tool, rack teeth on the sides of said sleeves, upper and lower pinions on said support engaged respectively with the racks on said upper and lower sleeves, an intermediate gear engaged between said pinions, an operating shaft connected to said upper pinion, a handle connected to rotate said operating shaft and move said operating shaft and upper pinion axially out of engagement with the rack on said upper sleeve, said intermediate gear being wide enough to remain in mesh with said upper pinion, reversely driven drive pulleys rotatably mounted about the upper end of said hollow shaft, a drive wheel between said drive pulleys and having splined driving engagement with said hollow shaft, electro-magnetic elements for selectively connecting said drive pulleys with said wheel, means connected to the upper end of said inner shaft for driving the same, a pair of switches positioned adjacent said intermediate gear and electrically connected to reverse the energization of said electro-magnetic elements, and cams adjustably mounted on said intermediate gear to actuate said switches at selected points in the rotation of said gears.

2. A drilling and tapping tool comprising a support head with a work table positioned therebelow, upper and lower drive sleeves coaxially arranged and vertically slidably mounted in said head, a hollow drive shaft rotatably and axially slidably mounted on said support and extending axially into said sleeves, a radially extending shoulder on said hollow shaft, a first thrust bearing between said shoulder and a portion of said upper sleeve, an inner drive shaft positioned within said hollow shaft and projecting from the upper end thereof, a shoulder on said inner shaft opposed to the shoulder on said hollow shaft, a second thrust bearing between said opposed shoulders, a lower tubular shaft rotatably mounted within said lower sleeve and around said inner shaft, a third thrust bearing axially engaged and retained between said lower sleeve and said tubular shaft, angularly spaced axially extending fingers on the upper end of said tubular shaft axially slidably and angularly drivingly engaged with mating fingers on the lower end of said hollow shaft, a chuck on the lower end of said inner shaft, a chambered housing removably secured to the lower end of said tubular shaft and having a shoulder engageable with the lower end of said chuck, said housing defining an upwardly tapered hole coaxial with said chuck, a drill received in said chuck and extending through said hole in said housing, a hollow tapping tool sleeved around said drill and having its upper end engaged in said hole in said housing, said drill having a tip of the same size as said tapping tool, rack teeth on the sides of said sleeves, upper and lower pinions on said support engaged respectively with the racks on said upper and lower sleeves, an intermediate gear engaged between said pinions, an operating shaft connected to said upper pinion, a handle connected to rotate said operating shaft and move said operating shaft and upper pinion axially out of engagement with the rack on said upper sleeve, said intermediate gear being wide enough to remain in mesh with said upper pinion, reversely driven drive members rotatably mounted about the upper end of said hollow shaft, a drive wheel between said drive members and having splined driving engagement with said hollow shaft, electro-magnetic elements for selectively connecting said drive members with said wheel, means connected to the upper end of said inner shaft for driving the same, a pair of switches positioned adjacent said intermediate gear and electrically connected to reverse the energization of said electro-magnetic elements, and cams adjustably mounted on said intermediate gear to actuate said switches at selected points in the rotation of said gears.

3. A drilling and tapping tool comprising a support head with a work table positioned therebelow, upper and lower drive sleeves coaxially arranged and vertically slidably mounted in said head, a hollow drive shaft rotatably and axially slidably mounted on said support and extending axially into said sleeves, a radially extending shoulder on said hollow shaft, a first thrust bearing between said shoulder and a portion of said upper sleeve, an inner drive shaft positioned within said hollow shaft and projecting from the upper end thereof, a shoulder on said inner shaft opposed to the shoulder on said hollow shaft, a second thrust bearing between said opposed shoulders, a lower tubular shaft rotatably mounted within said lower sleeve and around said inner shaft, a third thrust bearing axially engaged and retained between said lower sleeve and said tubular shaft, angularly spaced axially extending fingers on the upper end of said tubular shaft axially slidably and angularly drivingly engaged with mating fingers on the lower end of said hollow shaft, a chuck on the lower end of said inner shaft, a chambered housing removably secured to the lower end of said tubular shaft and having a shoulder axially overlapping the lower end of said inner shaft and adapted to support the inner shaft, said housing defining an upwardly tapering hole coaxial with said chuck, a drill received in said chuck and extending through said hole in said housing, a hollow tapping tool sleeved around said drill and having its upper end engaged in said hole in said housing, said drill having a tip of the same size as said tapping tool, rack teeth on the sides of said sleeves, upper and lower gears on said support engaged respectively with the racks on said upper and lower sleeves, an intermediate gear engaged between said upper and lower gears, an operating shaft connected to one of said gears, a handle connected to rotate said operating shaft, means actuated by said handle to move said upper gear axially out of engagement with the rack on said upper sleeve, said intermediate gear being wide enough to remain in mesh with said upper gear, reversely driven drive members rotatably mounted about the upper end of said hollow shaft, electro-magnetically actuated means for selectively connecting said drive members with said hollow shaft, means connected to the upper end of said inner shaft for driving the same, a pair of switches positioned adjacent said intermediate gear and electrically connected to reverse the energization of said electro-magnetic means, and cams adjustably mounted on said intermediate gear to actuate said switches at selected points in the rotation of said gears.

4. A drilling and tapping tool comprising a support head with a work table positioned therebelow, upper and lower drive sleeves coaxially arranged and vertically slidably mounted in said head, a hollow drive shaft rotatably and axially slidably mounted on said support and extending axially into said sleeves, a radially extending shoulder on said hollow shaft, a first thrust bearing between said shoulder and a portion of said upper sleeve, an inner drive shaft positioned within said hollow shaft and projecting from the upper end thereof, a shoulder on said inner shaft opposed to the shoulder on said hollow shaft, a second thrust bearing between said opposed shoulders, a lower tubular shaft rotatably mounted within said lower sleeve and around said inner shaft, a third thrust bearing axially engaged and retained between said lower sleeve and said tubular shaft, angularly spaced axially extending fingers on the upper end of said tubular shaft axially slidably and angularly drivingly engaged with mating fingers on the lower end of said hollow shaft, a chuck on the lower end of said inner shaft, a chambered housing removably secured to the lower end of said tubular shaft and having a shoulder axially overlapping the lower end of said inner shaft and adapted to support the inner shaft, said housing defining an upwardly tapering hole coaxial with said chuck, a drill received in said chuck and extending through said hole in said housing, a hollow tapping tool sleeved around said drill and having its upper end engaged in said hole in said housing, said drill having a tip of the same size as said tapping tool, rack teeth on the sides of said sleeves, upper and lower gears on said support engaged respectively with the racks on said upper and lower sleeves, an intermediate gear engaged between said upper and lower gears, an operating shaft connected to one of said gears, a handle connected to rotate said operating shaft, means actuated by said handle to move said upper gear axially out of engagement with the rack on said upper sleeve, said intermediate gear being wide enough to remain in mesh with said upper gear, reversely driven drive members rotatably mounted about the upper end of said hollow shaft, electro-magnetically actuated means for selectively connecting said drive members with said hollow shaft, means connected to the upper end of said inner shaft for driving the same, a pair of switches electrically connected to reverse the energization of said electro-magnetic means, and angularly adjustable cams driven in timed relation to said intermediate gear to actuate said switches at selected points in the rotation of said gears.

5. A drilling and tapping tool comprising a support head with a work table positioned therebelow, upper and lower drive sleeves coaxially arranged and vertically slidably mounted in said head, a hollow drive shaft rotatably and axially slidably mounted on said support and extending axially into said upper sleeve, a first thrust area between an upwardly facing surface of said hollow shaft and a downwardly facing portion of said upper sleeve, an inner drive shaft positioned within said hollow shaft and projecting from the upper end thereof, a second thrust area between an upwardly facing portion of said inner shaft and a downwardly facing portion of said hollow shaft, a lower tubular shaft rotatably mounted within said lower sleeve and around said inner shaft, a third thrust area between a downwardly facing portion of said lower sleeve and an upwardly facing portion of said tubular shaft, a fourth thrust area between an upwardly facing portion of said lower sleeve and a downwardly facing portion of said tubular shaft, means axially slidably and angularly drivingly connecting the upper end of said tubular shaft with the lower end of said hollow shaft, a chuck on the lower end of said inner shaft, an end member removably secured to the lower end of said tubular shaft and axially engageable with the lower end of said inner shaft, said end member defining a hole coaxial with said chuck, a drill received in said chuck and extending through said hole in said end member, a hollow tapping tool sleeved around said drill and having its upper end engaged in said hole in said end member, said drill having a tip of the same size as said tapping tool, rack teeth on the sides of said sleeves, upper and lower gears on said support engaged respectively with the racks on said upper and lower sleeves, an intermediate gear engaged between said pinions, a handle connected to rotate said gears, means actuated by said handle to move said upper gear axially out of engagement with the rack on said upper sleeve, said intermediate gear being wide enough to remain in mesh with said upper gear, reversely driven drive members rotatably mounted about the upper end of said hollow shaft, means for selectively connecting said drive members with said hollow shaft, and means connected to the upper end of said inner shaft for driving the same.

6. A drilling and tapping tool comprising a support head with a work table positioned therebelow, upper and lower drive sleeves coaxially arranged and vertically slidably mounted in said head, a hollow drive shaft rotatably and axially slidably mounted on said support and extending axially into said upper sleeve, a first thrust area between an upwardly facing surface of said hollow shaft and a downwardly facing portion of said upper sleeve, an inner drive shaft positioned within said hollow shaft and projecting from the upper end thereof, a second thrust area between an upwardly facing portion of said inner shaft and a downwardly facing portion of said hollow shaft, a lower tubular shaft rotatably mounted within said lower sleeve and around said inner shaft, a third thrust area between a downwardly facing portion of said lower sleeve and an upwardly facing portion of said tubular shaft, a fourth thrust area between an upwardly facing portion of said lower sleeve and a downwardly facing portion of said tubular shaft, means axially slidably and angularly drivingly connecting the upper end of said tubular shaft with the lower end of said hollow shaft, a chuck on the lower end of said inner shaft, an end member removably secured to the lower end of said tubular shaft and axially engageable with the lower end of said inner shaft, said end member defining a hole coaxial with said chuck, a drill received in said chuck and extending through said hole in said end member, a hollow tapping tool sleeved around said drill and having its upper end engaged in said hole in said end member, said drill having a tip of the same size as said tapping tool, rack teeth on the sides of said sleeves, upper and lower gears on said support engaged respectively with the racks on said upper and lower sleeves, an intermediate gear engaged between said pinions, a handle connected to rotate said gears, means to move said upper gear axially out of engagement with the rack on said upper sleeve, said intermediate gear being wide enough to remain in mesh with said upper gear, reversely driven drive members rotatably mounted about the upper end of said hollow shaft, means for selectively connecting said drive members with said hollow shaft, and means connected to the upper end of said inner shaft for driving the same.

7. A drilling and tapping tool comprising a support head with a work table positioned therebelow, upper and lower drive sleeves coaxially arranged and vertically slidably mounted in said head, a hollow drive shaft rotatably and axially slidably mounted on said support and extending axially into said upper sleeve, means forming a rotatable axially downward thrust connection from said upper sleeve to said hollow shaft, an inner drive shaft positioned within said hollow shaft and projecting from the upper end thereof, means forming a rotatable axially downward thrust connection from said hollow shaft to said inner shaft, a lower tubular shaft rotatably mounted within said lower sleeve and around said inner shaft, means forming a rotatable axially downward and upward thrust connection from said lower sleeve to said tubular shaft, means forming an axially slidably and angularly drivingly engagement between said tubular shaft and said hollow shaft, a chuck on the lower end of said inner shaft, an end member removably secured to the lower end of said tubular shaft and having a portion axially engageable with the lower end of said inner shaft, said end member defining a hole coaxial with said chuck, a drill received in said chuck and extending through said hole in said end member, a hollow tapping tool sleeved around said drill and having its upper end engaged in said hole in said end member, said drill having a tip of the same size as said tapping tool, rack teeth on the sides of said sleeves, upper and lower gears on said support engaged respectively with the racks on said upper and lower sleeves, means for concurrently driving said gears, means for moving said upper gear axially out of engagement with the rack on said upper sleeve, reversely driven drive members rotatably mounted about the upper end of said hollow shaft, electro-magnetic means for selectively connecting said drive members with said hollow shaft, and means connected to the upper end of said inner shaft for driving the same.

8. A drilling and tapping tool comprising a support head with a work table positioned therebelow, upper and lower drive sleeves coaxially arranged and vertically slidably mounted in said head, a hollow drive shaft rotatably and axially slidably mounted on said support and extending axially into said upper sleeve, means forming a rotatable axially downward thrust connection from said upper sleeve to said hollow shaft, an inner drive shaft positioned within said hollow shaft and projecting from the upper end thereof, means forming a rotatable axially downward thrust connection from said hollow shaft to said inner shaft, a lower tubular shaft rotatably mounted within said lower sleeve and around said inner shaft, means forming a rotatable axially downward and upward thrust connection from said lower sleeve to said tubular shaft, means forming an axially slidably and angularly drivingly engagement between said tubular shaft and said hollow shaft, a chuck on the lower end of said inner shaft, an end member on the lower end of said tubular shaft and having a portion axially engageable with the lower end of said inner shaft, said end member defining a hole coaxial with said chuck, a drill received in said chuck and extending through said hole in said end member, a hollow tapping tool sleeved around said drill and having its upper end engaged in said hole in said end member, said drill having a tip of the same size as said tapping tool, rack teeth on the sides of said sleeves, upper and lower gears on said support engaged respectively with the racks on said upper and lower sleeves, means for concurrently driving said gears, means for moving said upper gear axially out of engagement with the rack on said upper sleeve, reversely driving drive members rotatably mounted about the upper end of said hollow shaft, means for selectively connecting said drive members with said hollow shaft, and means connected to the upper end of said inner shaft for driving the same.

9. In a machine tool, in combination, a first shaft 35 having a chuck 36 on one end for the reception of a drill bit, a second tubular shaft 28 sleeved around said first shaft and having a removable end piece 39 bridging the end of said first shaft, said end piece defining a tapered hole coaxial with said chuck to pass said drill bit and adapted to receive a tubular tapping tool, a first drive member 69 having an axially slidable rotary driving connection to said first shaft, a second drive member 23 sleeved around said first shaft and having an axially slidable rotary driving connection to said second shaft, a third drive member 55 having an axially slidable rotary driving connection to said second drive member, electro-magnetically actuated control means 60 for reversibly connecting said third drive member to a source of power, a first feed member 5 sleeved around said second drive member and having axial thrust engagement 26 with said second drive member in the direction of said second shaft, means 38 forming an axially directed thrust connection between said second drive member and said first shaft in the direction of said chuck, a second feed member 6 sleeved around said second shaft and having two way axial thrust engagement 30 therewith, rack and gear means 7, 8 for axially shifting said first feed member, other rack and gear means 9, 10 for axially shifting said second feed member, a manually actuated connecting gear 11 connecting the gears of said rack and gear means for simultaneous operation, manually actuated control means 12, 17 for disconnecting said first rack and gear means from driving engagement with said first feed member, and an electric switch 62 positioned to be actuated in timed relation to movement of said second feed member and electrically connected to reverse the energization of said electro-magnetically actuated control means.

10. In a machine tool, in combination, a first shaft having a chuck on one end for the reception of a drill bit, a second tubular shaft sleeved around said first shaft and having an end piece bridging the end of said first shaft, said end piece defining a hole coaxial with said chuck to pass said drill bit and adapted to receive a tubular tapping tool, a first drive member having an axially slidable rotary driving connection to said first shaft, a second drive member sleeved around said first shaft and having an axially slidable rotary driving connection to said second shaft, a third drive member having an axially slidable rotary driving connection to said second drive member, control means for reversibly connecting said third drive member to a source of power, a first feed member sleeved around said second drive member and having axial thrust engagement with said second drive member in the direction of said second shaft, means forming an axially directed thrust connection between said second drive member and said first shaft in the direction of said chuck, a second feed member sleeved around said second shaft and having axial thrust engagement therewith, rack and gear means for axially shifting said first feed member, and other rack and gear means for axially shifting said second feed member.

11. In a machine tool, in combination, a first shaft having a chuck on one end for the reception of a drill bit, a second tubular shaft sleeved around said first shaft and having a removable end piece bridging the end of said first shaft, said end piece defining a hole coaxial with said chuck to pass said drill bit, said end piece being adapted to receive a tubular tapping tool sleeved around said bit, a first drive member having an axially slidable rotary driving connection to said first shaft, a second drive member sleeved around said first shaft and having an axially slidable rotary driving connection to said second shaft, a third drive member having a rotary driving connection to said second drive member, electromagnetically actuated control means for reversibly connecting said third drive member to a source of power, a first feed member sleeved around said second drive member and having axial thrust connection to said second shaft in the direction of said chuck, means forming an axially directed thrust connection between said second drive member and said first shaft in the direction of said chuck, a second feed member sleeved around said second shaft and having axial thrust engagement therewith, means for axially shifting said first feed member, and other means for axially shifting said second feed member.

12. In a machine tool, in combination, a first shaft having a chuck on one end for the reception of a drill bit, a second tubular shaft sleeved around said first shaft and having an end piece bridging the end of said first shaft, said end piece defining a hole coaxial with said chuck to pass said drill bit, said end piece being adapted to receive a tubular tapping tool sleeved around said bit, a first drive member having an axially slidable rotary driving connection to said first shaft, a second drive member sleeved around said first shaft and having an axially slidable rotary driving connection to said second shaft, a third drive member having a rotary driving connection to said second drive member, control means for reversibly connecting said third drive member to a source of power, a first feed member sleeved around said second drive member and having axial thrust connection to said second shaft in the direction of said chuck, means forming an axially directed thrust connection between said second drive member and said first shaft in the direction of said chuck, a second feed member sleeved around said second shaft and having axial thrust engagement therewith, means for axially shifting said first feed member, and other means for axially shifting said second feed member.

References Cited in the file of this patent

UNITED STATES PATENTS

| | | |
|---|---|---|
| 132,396 | Gunn | Oct. 22, 1872 |
| 1,858,995 | Klausmeyer | May 17, 1932 |